July 31, 1951  H. E. ROGERS ET AL  2,562,212
LIQUID DISPENSING DEVICE

Filed May 10, 1948  3 Sheets-Sheet 1

INVENTORS.
Harold E. Rogers
Gail D. Doerr
BY
ATTORNEY

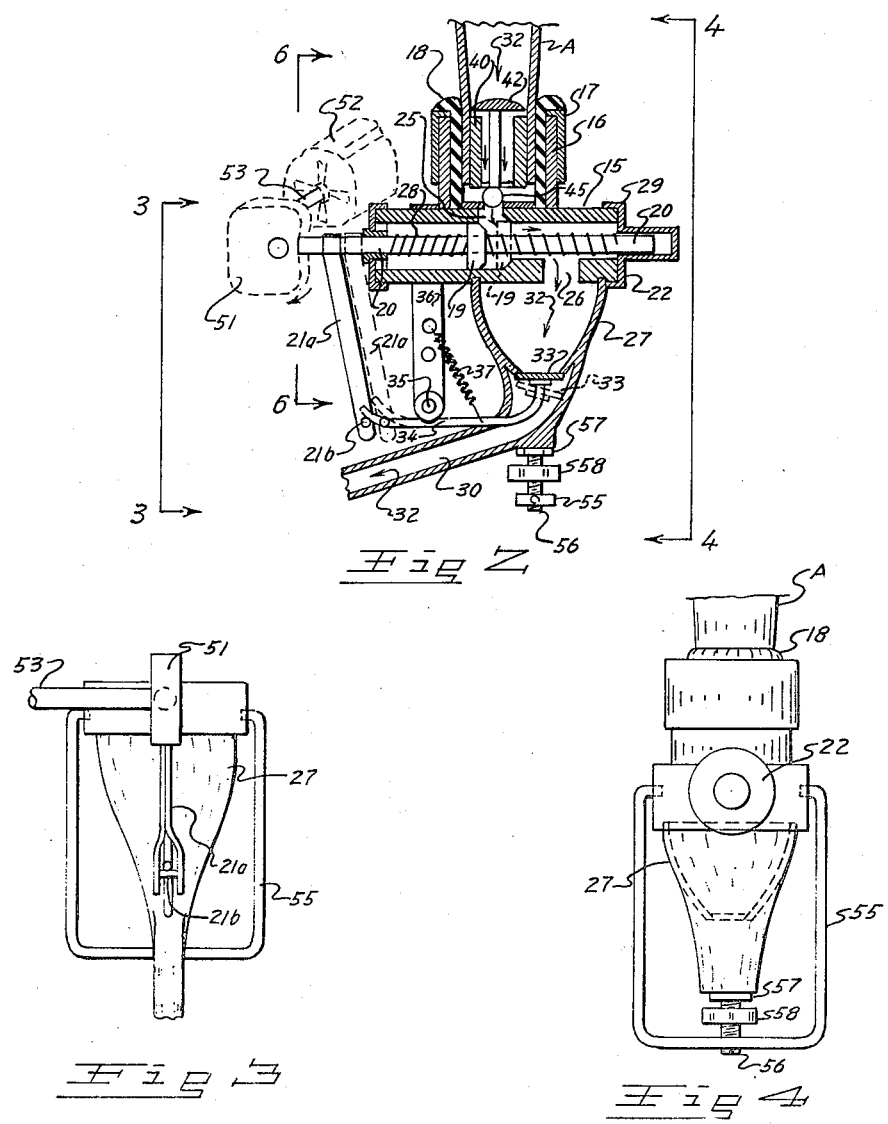

July 31, 1951  H. E. ROGERS ET AL  2,562,212
LIQUID DISPENSING DEVICE

Filed May 10, 1948  3 Sheets-Sheet 3

INVENTORS
Harold E. Rogers
Gail D. Doerr

BY

ATTORNEY

Patented July 31, 1951

2,562,212

UNITED STATES PATENT OFFICE 2,562,212

LIQUID DISPENSING DEVICE

Harold E. Rogers and Gail D. Doerr, Denver, Colo.

Application May 10, 1948, Serial No. 26,076

11 Claims. (Cl. 222—181)

The present invention relates to liquid dispensing devices. It has to do particularly, although not exclusively, with coin-controlled, manually-operated, or mechanically-operated dispensing devices for liquors, or the like, in predetermined accurate quantities, such as individual portions of one ounce fluid measure.

Generally speaking, the present invention relates to a coin-controlled dispensing device or apparatus for dispensing, for a predetermined amount of money, a predetermined quantity of liquid. The device comprises, preferably, a casing formed in two or more compartments which is capable of being secured to a bar or counter in a position accessible to an attendant, such as a bartender, or a patron, whereupon by the placement of a coin of given denomination into the device or apparatus, and by a simple manual or mechanical operation, a predetermined quantity of a given beverage, or the like, may be dispensed into a glass. The improved device or apparatus includes valve mechanism which is so arranged, proportioned and adjusted as to give forth or dispense an accurate and predetermined quantity of liquid with each operation, it being one of the important features of the present invention to so regulate the length and time of movement of the valve as to permit the passage of only the exact predetermined amount of liquid into the glass or other container with each paid operation of the apparatus.

One of the objects of the present invention is to provide a device or apparatus of the foregoing character having improved valve means and valve actuating means disposed between a source of liquid supply and a glass or container which functions rapidly and efficiently upon the insertion of a coin of predetermined denomination to dispense a given amount of liquid into the glass or other container.

Another object of the present invention is to provide an improved liquid dispensing device or apparatus which is coin controlled and manually or mechanically operated, having improved valve means and valve actuating means which will serve to dispense a predetermined quantity of liquid such, for example, as one ounce of the liquid, during a predetermined amount of movement or travel of the valve, such as one inch of travel of said valve.

A further object of the present invention is to provide a dispensing device or apparatus, as referred to above, in which an individual bottle of liquid, such as a bottle of spirituous liquor, is placed in inverted position within the apparatus and locked therein in a position to maintain a quantity of the liquor in a dischargeable reservoir at all times, said reservoir containing only a predetermined quantity of the liquor, comparable to the amount to which it is desired to dispense upon a single operation of the device or apparatus.

Another object of the present invention is to provide structure, as aforesaid, in which the constantly supplied reservoir is provided with contents-discharging means which can be moved to discharging position by manually or mechanically actuated means which is coin controlled.

Another object of the present invention is to provide an improved liquid dispensing apparatus for receiving and dispensing the contents of individual bottles, in which the apparatus includes a coin-controlled, manually or mechanically-operated dispensing valve assembly in which the assembly includes means for determining the amount of travel of the valve from its closed to its opened position, and vice versa, to thus regulate the quantity of liquid dispensed during each operation of the valve assembly.

A further object of the present invention is to provide a removable stopper for application to the neck of a bottle of liquid to permit the uncapped or uncorked bottle to be inverted and placed in the apparatus or dispensing device of the present invention without the danger of the accidental discharge of the contents of the bottle.

The foregoing and other objects and advantages of the present invention will appear from the following description and appended claims when considered in connection with the accompanying drawings forming a part of this specification, wherein like reference characters designate corresponding parts in the several views.

In said drawings:

Fig. 2 is a fragmentary detail vertical sectional view, partly in elevation, of the valve assembly and power-operated means for actuating the valve, being a modification of the actuating means of Fig. 1.

Fig. 3 is a fragmentary elevational view, taken generally along the line 3—3 of Fig. 2, looking in the direction of the arrows.

Fig. 4 is a fragmentary elevational view, taken generally along the line 4—4 of Fig. 2, looking in the direction of the arrows.

Before explaining in detail the present invention, it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention herein claimed beyond the requirements of the prior art.

Figure 1:
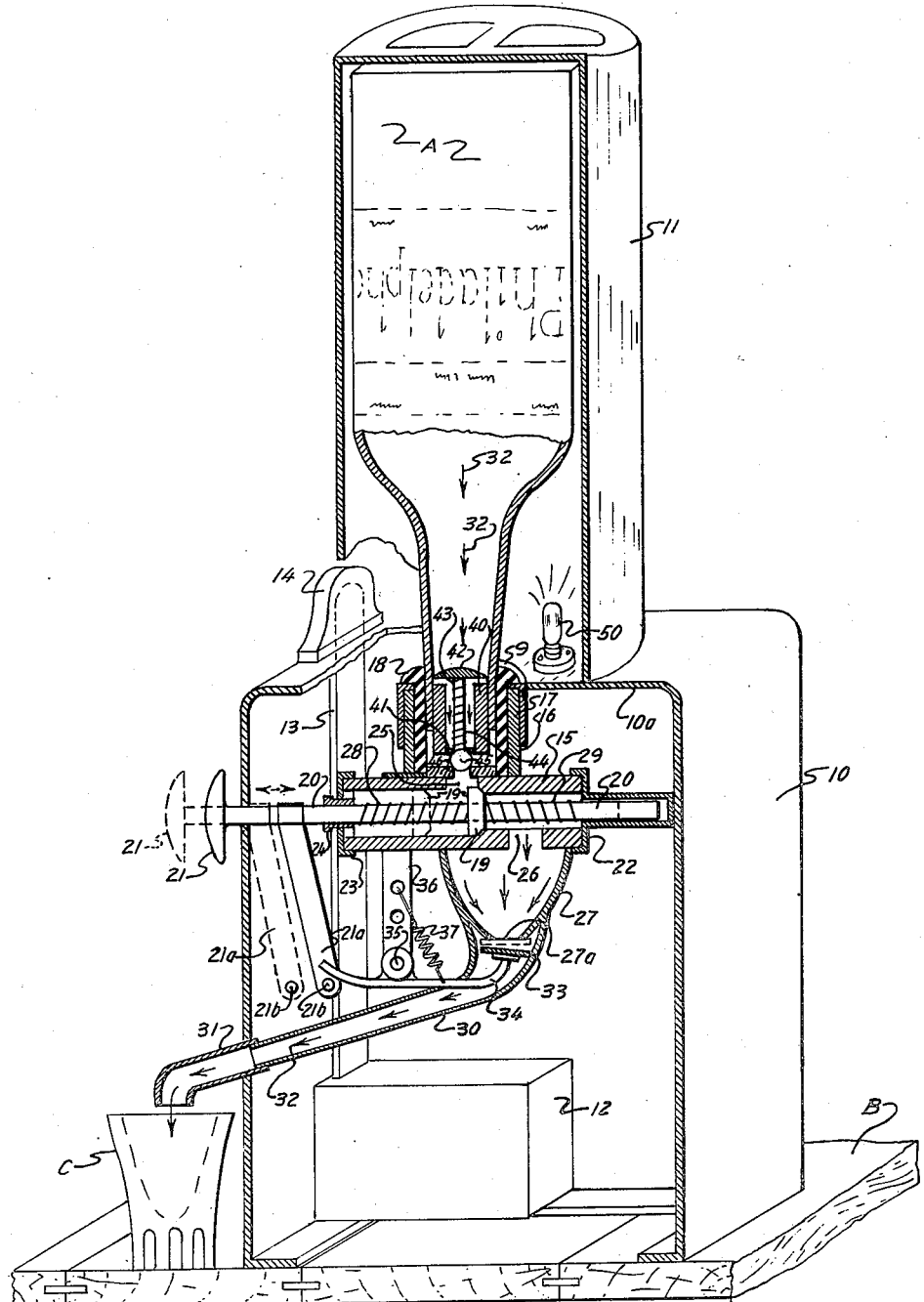
Fig. 1 is a vertical sectional elevation, shown in perspective, of one form of coin-controlled dispensing device or apparatus embodying the present invention, said device being shown mounted upon a bar surface or counter.

Referring now particularly to Fig. 1 of the drawings, there is shown in this figure one form of liquid dispensing apparatus or device embodying the present invention. The apparatus herein shown is mounted upon the top surface of a bar or counter B and comprises a casing or housing having a lower portion or section 10 and an upper and somewhat smaller portion or section 11. One side wall of the apparatus has been removed for purposes of clarity, but it is to be understood that this side wall (not shown) may be in the form of a one-piece plate or closure which is slipped on to the casing portions 10 and 11 and locked or clamped in place in any suitable manner and by any suitable locking means (not shown). As a matter of fact, however, the closure may be in the form of a plate or door for the casing portion 10 and a separate plate or door for the casing portion 11, both plates or doors being, if desired, hingedly mounted upon their respective casing portions. Thus, by providing two separate side closure plates or doors (not shown), the upper plate or door (also not shown) may be opened without disturbing the lower plate or door to permit the removal of an empty bottle or liquid container and the substitution of a full bottle or container, such as the bottle A.

The lower casing portion or section 10 has a top wall 10a which is provided with an opening which receives a socket into which the neck of the inverted bottle A is inserted. The socket will be described in detail below.

Figure 5:
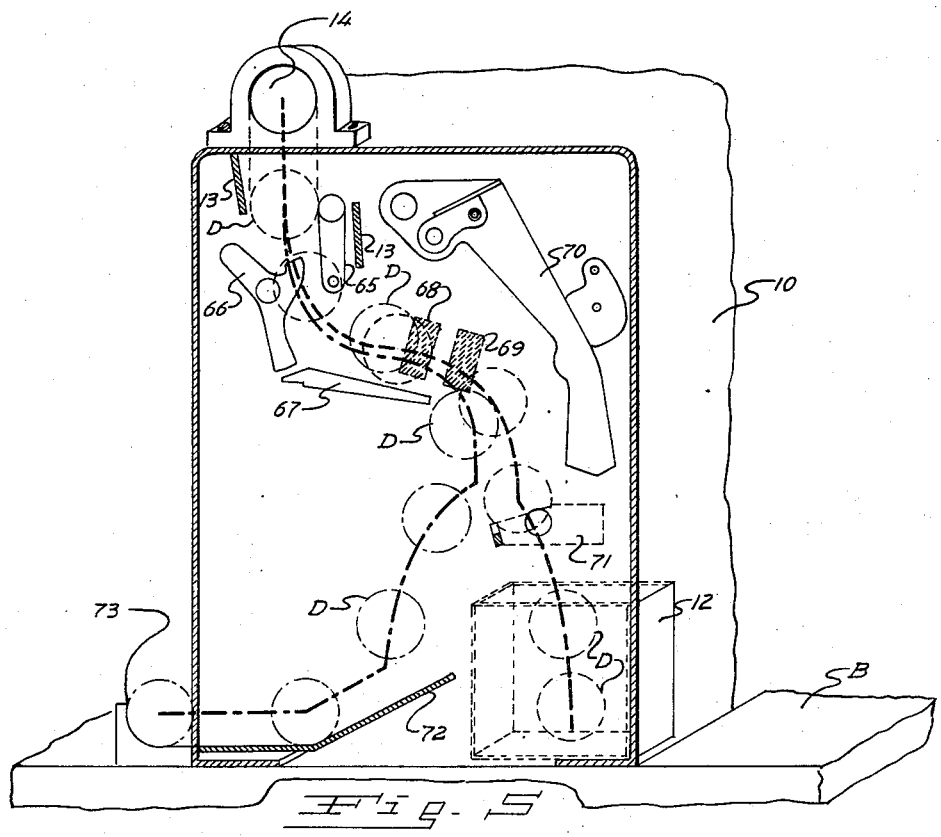
Fig. 5 is a vertical sectional view, partly in elevation, illustrating one type of coin-controlled mechanism employed in connection with the present invention.

The lower portion 10 of the casing houses a coin box or receptacle 12 having an access opening or locked door (not shown) which receives coins from a coin slot 13 which have been inserted through an exposed coin slot opening 14, see Figs. 1 and 5. Coin slot or passage 13 has associated with it coin detector and rejector mechanism of some suitable conventional type, such as that produced by National Slug Rejectors, Inc., of St. Louis, Missouri, such mechanism being described more in detail below and being illustrated in Figs. 5, 6 and 7 of the drawings.

Referring now particularly to Figs. 1 to 4, inclusive, there is shown in these figures the details of two forms of valve assembly and valve actuating mechanism for effecting the accurate dispensing of a predetermined quantity of liquid from the bottle A to the glass or other container C of Fig. 1. The valve assembly is preferably in the form of a body 15 having a cylindrical bore, usually a casting, the body having attached to its outer upper wall a ring-like socket or projecting portion 16 which is preferably cast integrally with the body 15. A ferrule 17 is preferably slipped over the sleeve member 16, and this assembly is adapted to be positioned within the opening 9 of casing wall or partition 10a. The opening 9 is of such size that the socket members 16, 17 will have a relatively snug fit in it when the valve body 15 is in the position in which it is shown in Fig. 1. The socket assembly includes a rubber sleeve or liner 18 into which the neck portion of bottle A is inserted.

The tubular body 15 of the valve assembly receives and supports a reciprocable valve 19 which is mounted upon a stem 20 which extends outwardly through an opening in the casing front wall and is provided with an operating handle or finger piece 21. The inner end portion of valve stem 20 extends into the pocket portion of a removable cap 22 which is preferably attached to the inner end of body 15. This member 22 may, if desired, be welded or otherwise secured to the rear wall of casing portion 10. The forward or outer end of body 15 is provided with a removable closure cap 23 having a centrally disposed guide member 24 through which the valve stem 20 projects. The upper wall of body 15 has an opening or passageway 25 and the lower wall thereof, an opening or passageway 26. The upper opening or passageway 25 communicates with the interior of socket portion 16 and with the bottle A. The opening 26 communicates with a cup-like reservoir, chamber, or receptacle 27 which is adapted to be filled successively with liquid from bottle A upon the authorized manipulation of the valve 19. Opposed compression springs 28 and 29 surround the stem 20 on opposite sides of valve 19, one end of each spring seating or resting against the valve with the opposite end thereof engaging its respective closure cap 22 or 23, as the case may be.

The cup-like reservoir or container member 27 is provided with an opening 27a in its base which is in communication with a tube or conduit 30 which fits into a discharge spout 31 mounted in an opening in the front wall of lower casing section or portion 10. Arrows 32 serve to indicate the flow of liquid from bottle A through valve body 15 into the cup-like reservoir 27 and thence through discharge conduit 30 and delivery spout 31 into glass C.

The opening 27a in member 27 is normally closed by a disc-like valve 33 carried by a swingable stem 34 which is pivotally mounted at 35 upon a depending arm or bracket 36. The parts of the valve assembly, the liquid-receiving cup 27 and the valve 33 for the latter, and its associated parts, are identical or substantially so, in Figs. 1 and 2.

A tension spring 37 connecting valve stem or arm 34 and member 36 tends to hold valve 33 upon its seat to close or seal the discharge opening 27a. When now a coin of the proper denomination is placed in the entrance 14 of coin slot 13, it travels downwardly to trip an arm (not shown in Figs. 1 and 2 but seen at 60 in Figs. 6 and 7) to release valve stem 20 so that finger piece 21 and depending arm 21a may be moved as a unit from their broken-line positions of Fig. 1 inwardly to their full-line positions to cause pin 21b to swing valve arm 34 in a clockwise direction about its pivot 35 to unseat valve 33 and to thus permit the liquid contents of cup-like receptacle 27 to be discharged through conduit 30 into glass C. Arm 21a may be a forked arm as seen in Fig. 3. During this action, valve 19 remains seated as seen in full lines in Fig. 1, thus shutting off communication between the bottle A and liquid-receiving cup 27. When, however, the valve finger piece 21 is pulled outwardly to its broken-line position of Fig. 1, spring 37 immediately reseats valve 33 and the reciprocable valve 19 is moved outwardly to its broken-line position, as seen in Fig. 1. By thus unseating valve 19, a predetermined quantity of liquid from bottle A flows through passages 25 and 26 into the cup-like receptacle or storage container 27. The spring 28 now functions promptly to return valve 19 to its seat, as seen in full lines, and thus cut off the flow of liquid from bottle A to receptacle 27 after the exact and predetermined measured amount of liquid has passed through the passageways. It will be understood that the springs 28 and 29 are so proportioned and operate in opposition to one another in such a manner as to definitely control the quantity of liquid allowed to flow through the passages, this quantity being determined by the speed of action or movement of valve 19 under the influence of the opposed springs 28 and 29. By varying the adjustment and/or the strength of these springs, the quantity of liquid which is allowed to flow into receptacle 27 may be varied at will.

It will be understood, of course, that the depending arm 21a is fixed in any suitable manner to valve stem 20. It will also be understood that pin 21b carried by said arm may be arranged at different locations on the arm or may be of different diameters or thickness so as to engage the valve stem or arm 34 at different times and at different positions of arm 21a with relation to valve stem or arm 34.

It is, of course, helpful in carrying out the present invention to provide removable means to be placed in the neck of bottle A after its cap or other closure has been removed to permit said bottle to be inverted and placed in the socket 16, 17, 18 of the dispensing device without spilling the contents thereof. For this purpose, there is provided a removable closure member which comprises a sleeve 40 having at its outer end a pair of crossed bars 41 through which the stem 43 of a disc valve 42 may pass. The stem 43 carries a tension spring 44 whose opposite ends are attached in any suitable manner to valve 42 and one of the crossed bars 41 so that the tendency of the spring is to seat valve 41 against the inner end of sleeve 40 to seal the contents of the bottle. As seen in Figs. 1 and 2, the socket 16 has disposed within it in the vicinity of passage 25 of valve body 15, a free ball valve 45 which, as shown, is mounted upon a pair of crossed bars 46 which provide a seat for the ball. When the bottle is inverted and inserted into socket 16, ball 45 engages valve stem 43 and lifts valve 42 from its seat against the action of tension spring 44. This permits liquid to flow through the tubular stopper member 40 and into passageway 25 formed in the valve body 15.

The upper portion 11 of the casing is preferably formed from metal although there may be a strip of sight glass (not shown) inserted in the front or other wall thereof so that a brand or label on bottle A can be seen by the customer. It may be desirable to illuminate the section 11 and for this purpose there is shown in Fig. 1 an electric lamp bulb 50 mounted upon casing wall 10a. Current may be supplied to this lamp bulb in any suitable manner and from any suitable source.

Referring now particularly to Fig. 2 of the drawings, there is shown in this figure a somewhat modified means for actuating valves 19 and 33. In accordance with this form of the invention, valve stem 20 and depending arm 21a may be shifted from the full-line position of Fig. 2 to the broken-line position of Fig. 2 by means of a cam member 51 mounted upon the shaft 53 of an electric motor 52. The electric motor is started in operation by the insertion of a coin of the proper denomination into coin slot 13, 14, whereupon the coin trips an arm (not shown in Fig. 2) to release stem 20 and actuates the motor to rotate cam 51. When so shifted to the right of Fig. 2, valve 19 moves to its broken-line and seated position to close communication between passages 25 and 26 and removes valve 33 from its seat surrounding the liquid discharge opening in the bottom of receptacle 27. When the contents of receptacle 27 has been discharged through conduit 30 to a glass, such as glass C of Fig. 1, cam 51 has moved to permit valve stem 20 and depending arm 21a to return to their normal positions toward the left in Fig. 2, with valve 33 having been moved back to its seated position by tension spring 37. It will be noted that valve 19 normally remains in its full-line position when the dispensing device is not being operated. This allows liquid to flow from bottle A through the connecting passageways to fill the cup-like receptacle 27, to be in readiness to dispense one portion of liquid upon the insertion of another coin and the second operation of electric motor 52 and cam 51.

As in the preceding form of the invention, the opposed compression springs 28 and 29 function to regulate the speed of movement of valve 19 and its stem 20. By varying the strength of these springs and by suitable adjustment, the quantity of liquid which is allowed to pass into the receptacle 27 may be regulated accurately. This quantity is also regulatable by virtue of the particular form of cam member 51 which is employed.

The cup-like receptacle 27 of Fig. 2 is clamped in position preferably by means of a clamping or U-shaped strap member 55, see particularly Figs. 3 and 4. This member depends from the main valve assembly including body 15 and extends downwardly beneath the lower end of the receptacle 27. The member 55 carries an adjustment screw 56 which is threaded through the base portion of member 55 and which carries a foot piece 57 adapted to contact the base of an extension from the receptacle 27. The screw or threaded stud 56 is provided with an adjusting finger piece 58 which when turned in a clockwise direction will force the member 57 into contact with said extension. The finger piece 58 may be turned in a counter-clockwise direction to release pressure and to permit release of the cup-like chamber or receptacle 27.

Figures 6, 7:
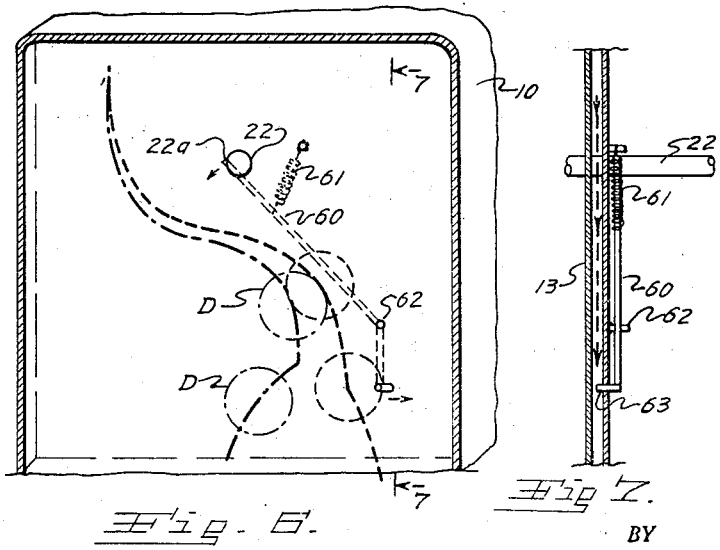
Fig. 6 is a detail sectional view, partly in elevation, showing the relationship of the coin tripped arm or lever and the valve actuating stem or shaft.
Fig. 7 is a fragmentary elevation of the mechanism of Fig. 6 taken substantially along the line 7—7 of Fig. 6, looking in the direction of the arrows.

Referring now particularly to Figs. 5, 6 and 7 of the drawings, there is shown in these figures some of the details of the detector and rejector mechanism of the coin slot 13 which is illustrated generally in Fig. 1. The particular mechanism disclosed in these figures is purchased from the manufacturer above mentioned and per se does not form a part of the present invention. As seen in Figs. 6 and 7, the valve stem 22 of both forms of the invention, is slotted at 22a to receive a pivoted valve stem latching rod or member 60. This rod 60 is urged to its latching position within slot 22a by a tension spring 61. When, however, a coin of the proper denomination passes downwardly through slot 13 (see Fig. 5) to the proper position, the arm 60 is tripped and released from engagement in the slot in the valve stem or rod 20, thus permitting the stem to be reciprocated in the manner as described above, either manually or by motor-driven cam 51.

As seen in Fig. 7, the rod 60 is fulcrumed on pin 62 and carries at its end an offset projecting portion 63 which extends into the coin slot 13.

With reference particularly to Figs. 5 and 6, the two paths traversed by a coin which is inserted in the entrance 14 of coin slot 13 are illustrated by broken-line circles D. In Fig. 5, a pendulum 65 is disposed at one side of the coin slot and an undersize level 66 at the opposite side of said slot. A coin passing these two members engages a rail 67 and is directed by a pair of magnets 68 and 69. The mechanism includes a wiper blade 70 disposed in the vicinity of the magnets, and the particular wiper blade herein shown is designed for use in connection with twenty-five cent pieces. A coin after passing the magnets 68 and 69, if of the right denomination, namely a twenty-five cent piece, will engage coin separator 71 and thence drop into coin box 12. If a coin of another denomination, or if a slug is inserted into the slot opening 14, the detector and rejector mechanism will function to cause this coin to move from magnet 69 in a path to the left in Fig. 5, engaging a rail or platform 72 and be discharged from casing portion 10 into a receptacle 73 provided especially for rejected coins.

In view of the fact that the present dispensing apparatus or machine employs in its combination conventional time-controlled mechanism such as that herein referred to and illustrated particularly in Fig. 5, it is deemed unnecessary herein to describe this mechanism in greater detail.

The casing of the dispensing apparatus may be secured in place upon a bar or counter in any suitable manner and by any suitable means (not shown) to permit it to be easily attached to or removed from said counter. Moreover, if desirable, a single casing or housing, similar to that illustrated in Fig. 1, may be made of larger proportions so as to accommodate a plurality of series of dispensing bottles or other containers, along with independent and individual coin-controlled mechanism and valve assemblies and actuating means so that several different kinds of liquids may be dispensed from within a common casing or apparatus. Furthermore, the upper and lower portions or sections of the casing as disclosed in Fig. 1 may be made into separate parts or may be formed in one piece, if desired. The particular material from which the casing is formed is immaterial although metal is probably the preferred material for this use. If desired, however, the casing may be formed from plastic, wood, or even from relatively heavy glass, Pyrex, or the like.

One of the principal uses for the dispensing apparatus of the present invention is in connection with the sale of spirituous liquors. By using the present coin-controlled apparatus, the purchaser is not only assured of obtaining the brand of liquor which he desires, but also the exact quantity which is represented by the denomination of the coin inserted in the machine. This eliminates "cheating" which is so prevalent among dispensaries of spirituous liquors and other beverages. Moreover, by the use of apparatus or devices embodying the present invention, the owner or operator of the dispensary effects great savings by eliminating the usual loss of stock due to dishonest practices perpetrated by his employees.

Having thus described the invention, what is claimed is:

1. A liquid dispensing apparatus comprising a casing having lower and upper portions, a partition wall between the upper and lower portions having an opening formed therein, a relatively deep bottle neck-receiving socket disposed within said opening to receive and support a bottle of liquid in inverted position, a valve assembly associated with said socket, a reciprocable valve and valve stem within the valve assembly, a reservoir in communication with and attached to said valve assembly for maintaining a predetermined quantity of liquid received from said inverted bottle, a discharge spout extending from the lower end of the reservoir to a point outside said lower casing member, a movable valve for controlling communication between the reservoir and discharge spout, common means associated with said reciprocable valve and said reservoir valve and including an arm depending from and movable with said valve stem for moving said valves at predetermined times to transfer a predetermined quantity of liquid from the reservoir to the discharge spout and a like predetermined quantity of liquid from the bottle to the reservoir, and spring means disposed at opposite sides of the reciprocable valve to control the amount and speed of travel of said valve.

2. Structure according to claim 1, wherein said common means includes a manually movable handle adapted to be moved in one direction to shift the reciprocable valve and to be moved in the opposite direction under the action of the spring means associated with said valve.

3. In a liquid dispensing apparatus, the combination of a casing having upper and lower compartments separated by a substantially horizontal wall, said wall having an opening formed therein, a liquid flow control valve assembly having a body portion and a reciprocable valve therein, said valve body portion having passageways formed in its upper and lower walls, a bottle neck-receiving socket mounted upon said valve body and having its upper portion located within the opening in the substantially horizontal wall, a non-metallic lining for said socket against which the neck of a bottle rests when in inverted position within the upper compartment of the casing, a valve stem carrying said valve and extending forwardly through an opening in a wall of the lower compartment and having an external finger piece thereon, said upper passageway and the interior of said socket and the bottle being in communication, a detachable reservoir removably clamped to the underside of the valve body and surrounding the lower passageway in said body, said reservoir having an opening formed in its lower end communicating with a discharge spout extending through a wall of the lower compartment and terminating exteriorly thereof, a movable valve located within the discharge spout and having an actuating stem projecting outside said spout for closing the opening in the reservoir, spring means for normally maintaining said valve in closed position, releasable means associated with the first-named valve stem for maintaining said stem normally immovable to permit manual or other movement of said stem at predetermined times, means carried by said first-named valve stem and depending therefrom for contacting the second-named valve stem when the first-named valve is moved in one direction, spring means for seating the reservoir valve when the stem is moved in the opposite direction, an opposed spring means disposed at opposite sides of the first-named valve for controlling the amount and speed of travel of said valve to thus determine the quantity of liquid which flows from the bottle into the reservoir.

4. Structure according to claim 3, wherein electric illuminating means is disposed within the casing to illuminate the bottle located therein, and wherein a sight glass is disposed in a casing wall opposite said bottle.

5. Structure according to claim 3, wherein movable sealing means is located in the bottle neck, and wherein means is located within the socket for unseating the sealing means when the inverted bottle is positioned within said socket.

6. Structure according to claim 3, wherein an electric motor and cam means are provided in lieu of said finger piece for actuating the liquid-controlling valve.

7. Structure according to claim 3, wherein the body of the valve assembly and the socket for receiving the neck of the bottle are formed integrally.

8. Structure according to claim 3, wherein adjustable means is provided for controlling the amount and speed of travel of the liquid-controlling valve whereby to determine the quantity of liquid allowed to flow past said valve during each dispensing operation.

9. In a liquid dispensing apparatus, the combination of a casing for receiving and supporting a bottle of liquid to be dispensed, a socket provided to receive the bottle in inverted position, a valve assembly including a horizontally disposed body directly below and in communication with the socket, a reservoir below and in communication with said body, a discharge spout associated with said reservoir, valve means located in the body for controlling the flow of liquid from the bottle to the reservoir in predetermined amounts, and separate valve means for controlling the flow of liquid from the reservoir to the discharge spout.

10. Structure according to claim 9, wherein means is provided for effecting the simultaneous operation of said valves.

11. Structure according to claim 9, wherein an electric motor and cam means are provided for effecting the simultaneous operation of both valves.

HAROLD E. ROGERS.
GAIL D. DOERR.

REFERENCES CITED

The following references are of record in the file of this patent:

UNITED STATES PATENTS

| Number | Name | Date |
|---|---|---|
| 441,615 | Fairchild | Nov. 25, 1890 |
| 497,107 | Westlake et al. | May 9, 1893 |
| 943,649 | Buck | Dec. 21, 1909 |
| 1,260,335 | Cordley | Mar. 26, 1918 |
| 1,510,642 | Wyatt et al. | Oct. 7, 1924 |
| 1,624,231 | Goldrick | Apr. 12, 1927 |
| 1,837,764 | Drummond | Dec. 22, 1931 |
| 1,846,135 | Mickelson | Feb. 23, 1932 |
| 1,960,549 | Pond | May 29, 1934 |
| 2,039,624 | Bigelow | May 5, 1936 |
| 2,117,437 | Lohn | May 17, 1938 |